United States Patent
Chen et al.

(10) Patent No.: US 10,078,424 B2
(45) Date of Patent: Sep. 18, 2018

(54) RECOGNITION AND DISPLAY OF READING PROGRESS

(71) Applicant: International Business Machines Corporation, Armonk, NY (US)

(72) Inventors: Lu Chen, Ningbo (CN); Ke Gong, Ningbo (CN); Jin Shi, Ningbo (CN); Ting Ting Wu, Ningbo (CN); Hai Dong Zhang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 14/939,182

(22) Filed: Nov. 12, 2015

(65) Prior Publication Data

US 2017/0139547 A1 May 18, 2017

(51) Int. Cl.
*G06F 3/0482* (2013.01)
*G06F 3/0485* (2013.01)

(52) U.S. Cl.
CPC .......... *G06F 3/0482* (2013.01); *G06F 3/0485* (2013.01)

(58) Field of Classification Search
CPC .............................. G06F 3/0482; G06F 3/0485
See application file for complete search history.

(56) References Cited

U.S. PATENT DOCUMENTS

| | | | |
|---|---|---|---|
| 8,060,634 B1 | 11/2011 | Darnell et al. | |
| 8,255,835 B2 | 8/2012 | Bocking | |
| 9,098,176 B1 * | 8/2015 | Tauber | G06F 17/30 |
| 2011/0225492 A1 * | 9/2011 | Boettcher | G06F 3/0485 |
| | | | 715/702 |
| 2012/0042277 A1 * | 2/2012 | Lin-Hendel | G06F 3/0482 |
| | | | 715/784 |
| 2014/0019548 A1 * | 1/2014 | Rafsky | H04L 51/00 |
| | | | 709/204 |
| 2014/0096079 A1 * | 4/2014 | Sasaoka | G06Q 10/10 |
| | | | 715/810 |
| 2014/0324984 A1 | 10/2014 | Chang et al. | |

FOREIGN PATENT DOCUMENTS

| | | |
|---|---|---|
| WO | 2014056516 A1 | 4/2014 |
| WO | 2014090027 A1 | 6/2014 |

OTHER PUBLICATIONS

Constine, Josh, "Facebook Displaying Unread Messages from Pages in a New Updates Module", Jan 13, 2011, 6 pages, <http://www.adweek.com/socialtimes/page-messages-unread-updates/255030>.
"Identifying Unread Messages Just Got a Whole Lot Easier on Yammer!", Mar. 30, 2011, 7 pages, <https://about.yammer.com/yammer-blog/identifying-new-yams/>.

* cited by examiner

*Primary Examiner* — Mandrita Brahmachari
(74) *Attorney, Agent, or Firm* — David B. Woycechowsky

(57) ABSTRACT

A computer-implemented method is disclosed. In the method, a start position of an item list comprising a plurality of items is determined in response to a session-in event. An end position of the item list is determined in response to a session-out event. The reviewed sub-list and unreviewed sub-list are differently displayed. The reviewed sub-list is at least a part of the item list and comprises items from the start position to the end position in the item list. The unreviewed sub-list comprises items outside the reviewed sub-list.

12 Claims, 3 Drawing Sheets

RECOGNITION AND DISPLAY OF READING PROGRESS

BACKGROUND

The present invention relates to information processing, and more specifically, to recognition and display of reading progress of a human readable list of links to human consumable content items (for example, text, images, videos, etc.). Each item on the list of links may include descriptive text, image(s), audio or video, in addition to the link. However, the following terminology should be understood: (i) "item" refers to content that accompanies the link in a list of linked items (typically, any content that is part of an "item" will be brief and/or small so that the list of "items" can be displayed in a relatively small space so that a user can quickly move through the list of items); (ii) "linked content" (or, more simply, "content" refers to the content to which an item links, which is to say that, "linked content" is not part of the item as the item is displayed on the list; (iii) an "unreviewed item" is an item on a list where it is expected that the user has not seen the item on the list, and also has not activated the link to be presented with the associated linked content; (iv) a "reviewed item" is an item which has been presented in (for example, displayed in) an items list sufficiently that the user would be expected to have seen or hear the item listing; and (v) a "read item" is an item where the user has activated the link in the item to see the linked content.

There are many social media tools (herein sometimes referred to, more simply, as "social tools"), which enrich the ways for users to get real time events or status from their friends and/or other associates. The social tool usually lists the up-to-date news or status in real time. A user typically browses the list to decide which items have potentially interesting linked content and then "clicks" (that is activates) the corresponding link(s) for details. So, there is a concept of "reading progress" for a given list of items, identifying a "reviewed sub-list" (of reviewed items and read items, sometimes more simply referred to as a "reviewed list") and an "unreviewed list sub-list" (of unreviewed items, sometimes more simply referred to as an unreviewed list"). In one typical variation, a given list may be instead broken down into a "read sub-list" (of read items) and an unread list (of reviewed items and unreviewed items). In yet another known variation, there may three sub-lists as follows: (i) an "unreviewed sub-list" (of unreviewed items); (ii) a "reviewed-not-read" sub-list (of reviewed items); and (iii) a "read sub-list" (of read items).

SUMMARY

According to an aspect of the present invention, there is a method, computer program product and/or system that performs the following operations (not necessarily in the following order): (i) receiving a plurality of chronologically-ordered items, with each item of the plurality of chronologically-ordered items: (a) including a linked to linked content, and (b) having a received date and time (date/time) associated with the item; (ii) dividing the list of items into a plurality of sub-lists where: (a) each sub-list is a list of chronologically consecutive item(s) having the same reader-attention status of a plurality of reader-attention statuses, and (b) each reader-attention status of the plurality of reader-attention statuses represents a different level of attention that a reader is likely to have given the item; and (iii) displaying the plurality of sub-lists in a direction that scrolls in a primary scrolling direction, with sub-list(s) corresponding to at least one reader-attention status of the plurality of reader attention statuses is displayed in a marquee fashion, where a sub-list displayed in a marquee fashion provides for scrolling through the items of the sub-list in a secondary scrolling direction that is orthogonal to the primary scrolling direction.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

According to one embodiment of the present invention, there is provided a computer-implemented method. In the method, a start position of an item list comprising a plurality of items is determined in response to a session-in event. An end position of the item list is determined in response to a session-out event. The read list and unread list are differently displayed. The read list is at least a part of the item list and comprises items from the start position to the end position in the item list. The unread list comprises items outside the read list.

According to another embodiment of the present invention, there is provided a system comprising one or more processors, a memory coupled to at least one of the processors, and a set of computer program instructions stored in the memory. The computer program instructions are executed by at least one of the processors in order to determine a start position of an item list comprising a plurality of items in response to a session-in event. The computer program instructions are executed by the processor to further determine an end position of the item list in response to a session-out event and differently display a read list and an unread list. The read list is at least a part of the item list. It comprises items from the start position to the end position in the item list. The unread list comprises items outside the read list.

According to still another embodiment of the present invention, there is provided a computer program product for recognizing and displaying reading progress. The computer program product comprises a computer readable storage medium having program instructions embodied therewith. The program instructions are executable by a processor to cause the processor to determine a start position of an item list comprising a plurality of items in response to a session-in event. The program instructions are also executable by a processor to cause the processor further to determine an end position of the item list in response to a session-out event and differently display a read list and an unread list. The read list is at least a part of the item list and comprises items from the start position to the end position in the item list. The unread list comprises items outside the read list.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. These embodiments are provided for the thorough and complete understanding of the present disclosure, and completely conveying the scope of the present disclosure to those skilled in the art.

Figure 1:
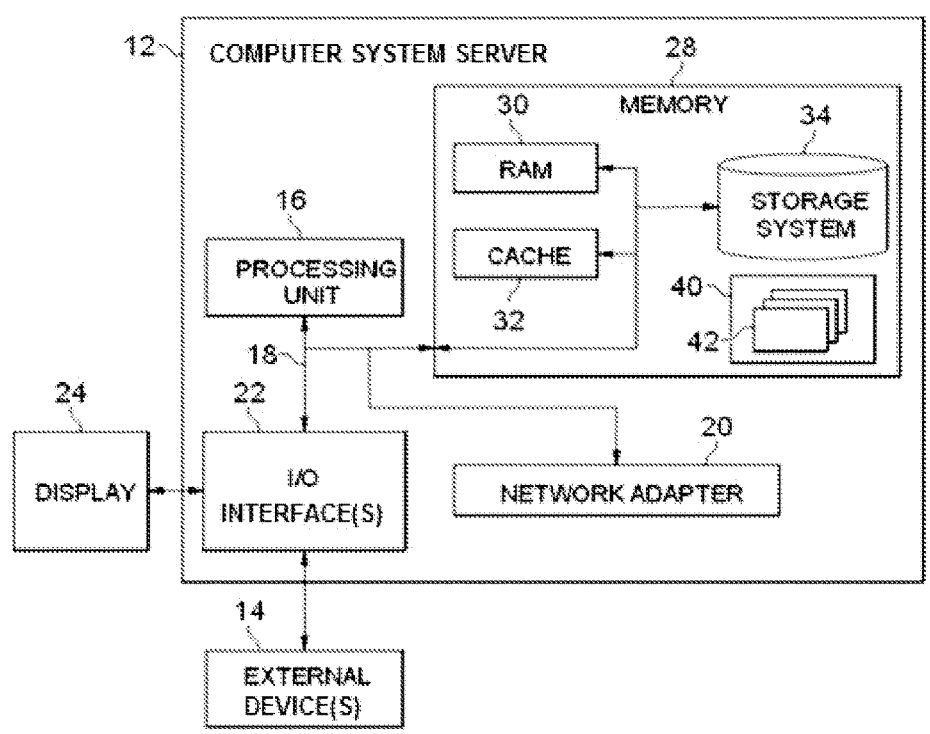
FIG. 1 shows a computer system which is applicable to implement the embodiments of the present invention.

Referring now to FIG. 1, computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A social tool application typically provides one, or more, item lists, such as news, status, and emails in real time (these different types of items may be in separate item lists, or in a combined list). A user of the social tool application browses an item list (that is, reviews items on the list) to decide which items are potentially interesting and then clicks on the corresponding content link(s) of the items to access respectively linked content. Because an item list typically updates intermittently (for example, in real time), there is a possibility that new items are received into the item list while the user have not completed reviewing (and selectively reading) all items that in the list prior to the intermittent update. When the items in the list are arranged in the time sequence, and the user has selectively read some list items, but not others, the item list will come to include a plurality of intermingled reviewed items and unreviewed items. In some embodiments of the present disclosure, there are two different unreviewed item sub-lists: (i) an old unreviewed sub-list; and (ii) a new unreviewed sub-list. An old unreviewed sub-list is made up of items which have: (i) been received by the user's device prior to the beginning of the current user session; but (ii) have never been presented (for example, displayed) to the user. A new unreviewed sub-list is made up of items which have been received subsequent to the beginning of the current user communication session.

In some embodiments of the present disclosure: (i) the new unreviewed sub-list is displayed on one side of the reviewed sub-list (that is immediately above or below for a vertically oriented item list); (ii) the old unreviewed sub-list is displayed on the opposite side of the reviewed sub-list; and (iii) the read list is "collapsed" (as will be further discussed in connection with FIG. 3). Sometimes this arrangement of lists is herein referred to as the unreviewed sub-lists "sandwiching" a read list. In order to make this kind of display, the device must determine which items belong respectively to the old unreviewed sub-list, the new unreviewed sub-list and the reviewed sub-list. In some embodiments, this is accomplished by determining which items occupy the start and end positions of the reviewed items sub-list. This way: (i) any item newer than the item at the start position of the reviewed item sub-list is part of the new unreviewed item sub-list; (ii) any item older than the item at the end position of the reviewed sub-list is part of the old unreviewed sub-list; and (iii) any items added between the times of the start position item of the reviewed sub-list and the end position item of the reviewed sub-list will belong to the reviewed sub-list. Therefore, if read lists can be identified, the unread lists will be the remaining parts of the whole list. Description of how to determine the items respectively at the start and end positions of a reviewed sub-list now will be made.

Figure 2:
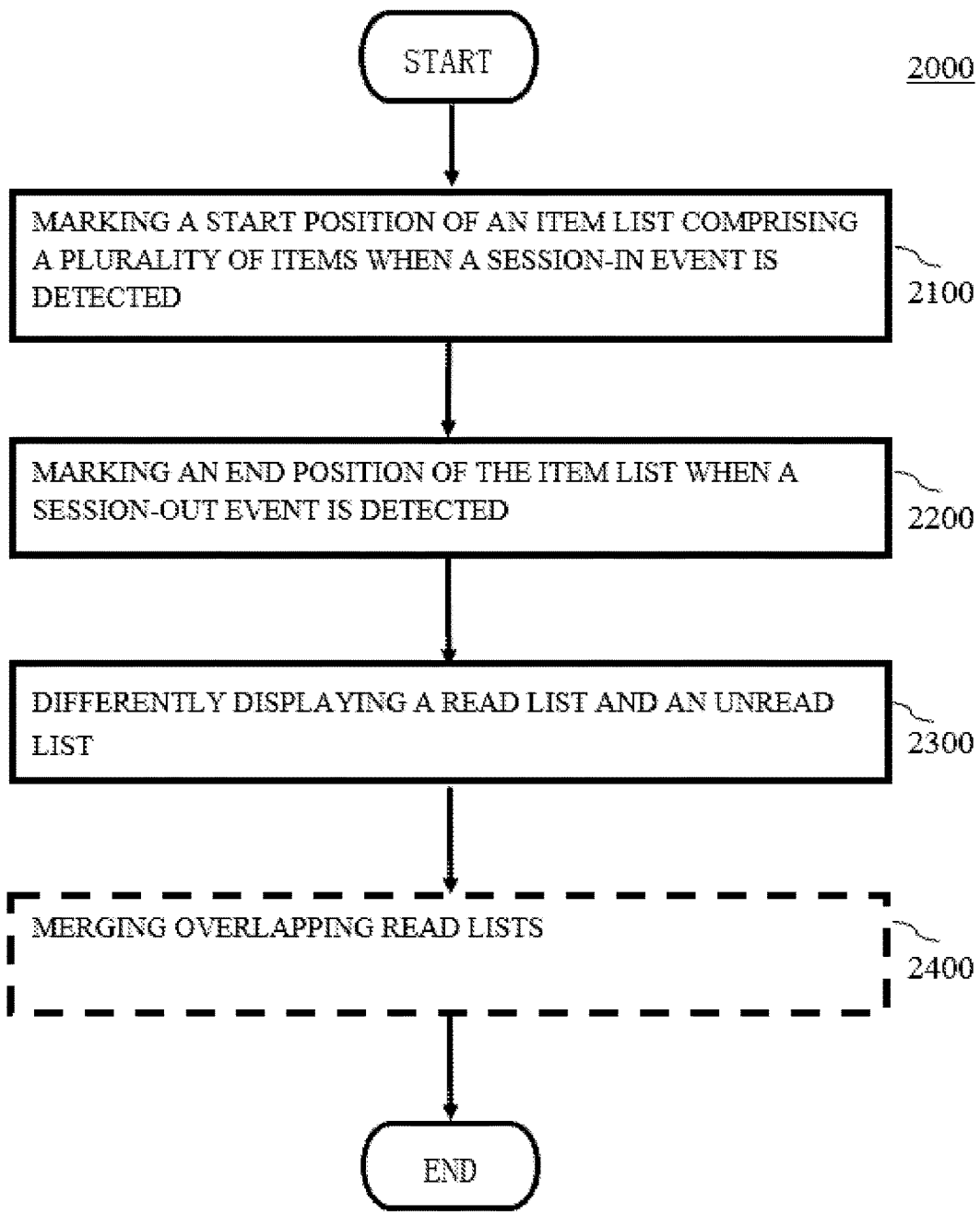
FIG. 2 shows a flow chart of a method according to an embodiment of the present invention.

With reference now to FIG. 2, FIG. 2 shows a flow chart of the method 2000 according to an embodiment of the present invention. In FIG. 2, the method 2000 includes steps 2100-2400, in which step 2400 is optional.

At step 2100, an item which will occupy the start position of a reviewed item sub-list, of a larger time sequenced item list, is determined in response to a "session-in event." In a given embodiment, the session-in event may be defined to be, or include, one of the following types of events: (i) starting, (ii) re-login and reopening, (iii) the application of a news or social media platform, and/or (iv) updating the item list. When a session-in event occurs, the most recent item in the item list will be determined as the item at the start position of the reviewed item sub-list (that is, the "start item"). After determining the start item, any item newer than the item in the start position will belong to a new unreviewed sub-list.

"Reviewed" and "unreviewed" are examples of what will sometimes herein be referred to as "reader-attention statuses." In a given embodiment, each reader-attention status of the embodiment's plurality of reader-attention statuses represents a different level of attention that a reader is likely to have given the item. Various embodiments of the present disclosure may use different combinations of reader-attention statuses. A list of some possible reader-attention statuses for use in various embodiments of the present invention include the following: (i) unreviewed, with an unreviewed item being an item that has not been displayed for sufficient time for a user to have had a reasonable opportunity to see the item; (ii) reviewed, with a reviewed item being an item that has been displayed for sufficient time for a user to have had a reasonable opportunity to see the item, regardless of whether or not a user has chosen to be presented with the linked content corresponding to the item; (iii) read, with a read item being an item where the user has chosen to be presented with the linked content corresponding to the item; (iv) reviewed-but-not-read, with a reviewed-but-not-read item being an item that has been displayed for sufficient time for a user to have had a reasonable opportunity to see the item, and the user has not chosen to be presented with the linked content corresponding to the item; and/or (v) unread, with an unread item being an item where the user has not chosen to be presented with the linked content, regardless of whether or not a user has been displayed for sufficient time for the user to have had a reasonable opportunity to see the item.

The previous paragraph makes reference to the concept of a reader having had (or not had) a reasonable opportunity to review an item. This determination of "reasonable opportunity" can be made in many various ways, as will be appreciated by those of skill in the art. One way to make this "reasonable opportunity determination is as follows: (i) any item(s) having a time/date later than an end time of the most recently completed list-viewing session are considered as items that the user has not had a reasonable opportunity to have read, unless and until the user chooses to be presented with linked content corresponding to that item; (ii) any item(s) having a time/date earlier than an end time of the most recently completed list-viewing session are considered as items that the user has had a reasonable opportunity to have read only if the item was displayed for a time exceeding a predetermined threshold time during a previous completed list viewing session; (iii) wherein a completed list-viewing session is any list viewing session that has been terminated prior to the current list-viewing session; and (iv) wherein a list-viewing session is a session where the display of the plurality of sub-lists is activated, regardless of whether the display of the plurality of sub-lists is continuously visible to the user during the period of its activation.

At step 2200, an end item of the reviewed sub-list is determined in response to a session-out event. The session-out event may be, for example, refreshing to update the item list, closing the application, time out of a session, or detection of logging in from another platform such as logging in from another user equipment. When the session-out event occurs, the end item of the reviewed sub-list will be determined. There can be various ways to determine the end item. In one way, the oldest item which has been read (that is, displayed in a detailed page, which shows details of the item) at the time of the session-out event is determined to be the end item of the reviewed sub-list. In another way, the end item is the oldest item that has been presented (for example, displayed) to the user in a presentation (for example, a display) of a portion of the item list. To explain, an item list will typically be longer than what can be displayed on a screen (for example, the screen of a mobile device). Therefore, not all list items are displayed, and a user, during a typical communication session will scroll the display through only a portion of the items of the item list. The end item of the reviewed item sub-list may be determined, without limitation, in the following ways: (i) oldest item currently displayed to the user at the time of the session-out event; (ii) oldest item that has been displayed to the user (for a meaningful length of time) during the course of the communication session; or (iii) the oldest read item.

Which position will be determined as the end position can depend on the page being displayed on the screen of the user equipment. In particular, when the page being displayed is a detailed page, the position of the current item can be determined as the end position. However, when the page being displayed is a list page, which shows the list of items, the position of the item at the bottom of the current screen can be determined as the end position.

The start and end items are in pairs and will serve to define the reviewed and unreviewed sub-lists next time the user refreshes the list or logs in the application. For example, when a user starts the application, the start item of the reviewed sub-list is freshly determined. When the user closes the application, the end item (for use when the next user session starts) is determined and its identity of the end item of the unreviewed sub-list is stored for later use at the next user session. In some embodiments, when the user refreshes to update the item list, an end item of the reviewed sub-list is determined before the item list actually updates, so that items that the user has had a chance to review (and selectively read), before the screen becomes filled with new list items received during the refresh operation, will be added to the reviewed item sub-list. This reviewed item sub-list may be displayed in a collapsed form, so it is helpful to try to make sure the reviewed item sub-list: (i) includes all items that the user has had a chance to review before they are added to this collapsed sub-list; and (ii) does not include items that the user has not had a meaningful opportunity to review as she is presented with portions of the items of the full item list. The foregoing discussion of step 2200 is an example of dividing a list of items into a plurality of sub-lists where each sub-list is a list of chronologically consecutive item(s) having the same reader-attention status of a plurality of reader-attention statuses.

At step 2300 the reviewed sub-list (generally, only a portion of the reviewed sub-list) is displayed in a different manner than the displayed portions of the unreviewed sub-list(s) are displayed. More specifically, in this embodiment, a portion of the reviewed sub-list will be displayed: (i) in a more space-efficient manner than displayed portions of the unreviewed sub-list(s); (ii) in a "collapsed form" that only shows one reviewed sub-list item at a time; and (iii) in a manner that is scrollable independently of the unreviewed sub-list(s). The reviewed sub-list comprises items from a start position to an end position following the start position in the item list, and a sub-list comprises items outside the read list. For unreviewed sub-lists, more particularly, items newer than the item in the current start position will be in the new unreviewed sub-list. Items earlier than the item in any end position will be in the old unreviewed sub-list.

Figure 3:
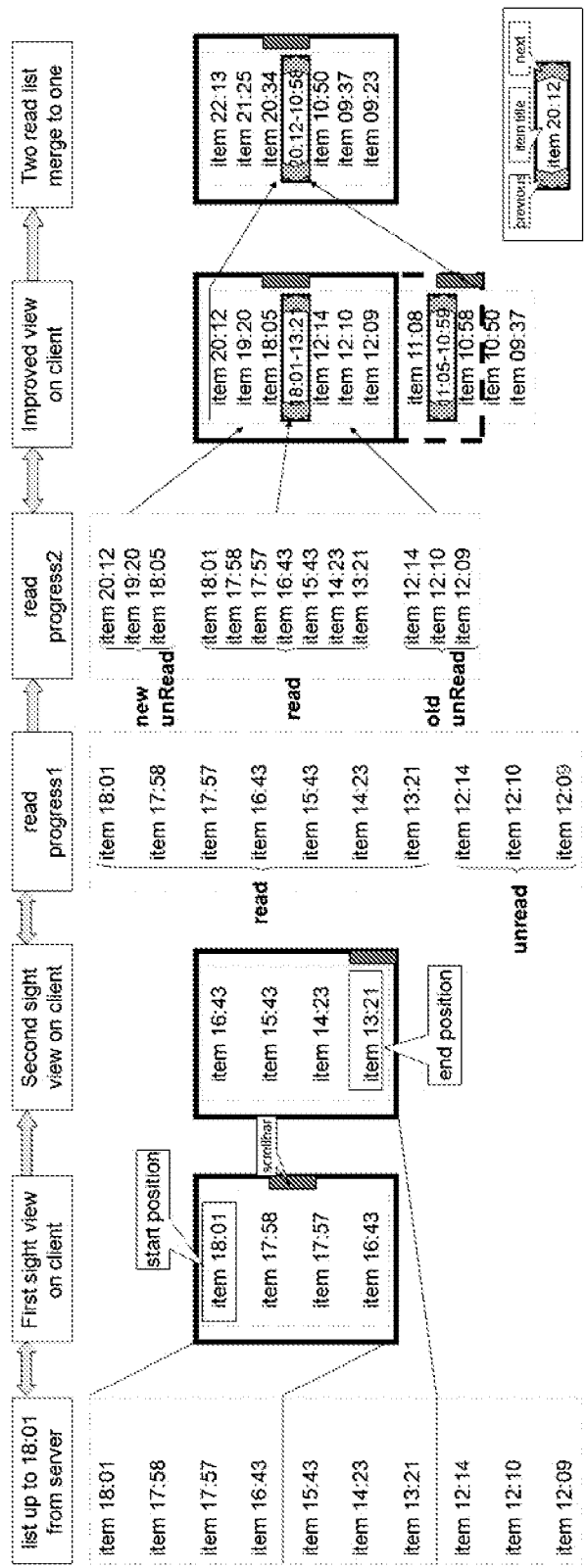
FIG. 3 shows an example to illustrate a method according to an embodiment of the present invention.

In some embodiments of the present disclosure, the reviewed sub-list and unreviewed sub-list(s) are displayed in such a way that the user can distinguish them easily. For example, at least one of the reviewed sub-list and the unreviewed sub-list can be displayed by a marquee control, in a file folder, or in a window. For other examples, the reviewed and unreviewed list(s) can be displayed in different colors, in different fonts, under different titles, on different backgrounds, with different sizes of letters, or with different luminance levels. In the example of FIG. 3, the reviewed sub-list is collapsed and displayed between displayed portions of two unreviewed sub-lists (that is new and old sub-lists).

In a preferable embodiment, when newer items come up while some old items have not yet been reviewed, the reviewed sub-list can be collapsed (for example, automatically or in response to user input) into the form of a "marquee control" and displayed between the new and old unreviewed sub-lists. The marquee control may comprises a window, a left button and a right button, as shown at the bottom right in FIG. 3. The window can be suitable to display one or two item(s), for example. In some embodiments, the user can click the left button of the marquee control to check previous read items and click the right button of the marquee control to check next read items.

By determining and displaying the read and unread lists as above, a quick way can be provided to a user to access items from both the reviewed and unreviewed sub-sub-lists, so that the user can find easily where to continue to review and selective reading of items, in the situation that he or she did not complete reviewing and selectively reading the items at a previous time. As shown in FIG. 3, it is possible to have more than one discrete reviewed item sub-list. For example, assume that: (i) a user has displayed to her a certain portion of list items during a first user session; and (ii) the user has displayed to her a different portion of list items during a second user session. In some embodiments, foregoing situation cases two read sub-lists to exist. In FIG. 3, the "improved view on client" shows how these two discrete sub-lists can be displayed in a vertically scrolling display. In some embodiments, multiple discrete reviewed item sub-lists are collapsed into a single marquee control. Also, as will be discussed in the next paragraph, in some embodiments, when reviewed sub-lists come to "overlap" through successive user sessions, session-in events and session-out events, then they will be merged into a single reviewed sub-list.

The foregoing discussion of step 2300 is an example of displaying a plurality of sub-lists in a direction that scrolls in a primary scrolling direction, with sub-list(s) corresponding to at least one reader-attention status of the plurality of reader attention statuses being displayed in a marquee fashion, where a sub-list displayed in a marquee fashion provides for scrolling through the items of the sub-list in a secondary scrolling direction that is orthogonal to the primary scrolling direction.

In some embodiments of the present disclosure: (i) there are two reader-attention statuses in the plurality of reader-attention statuses as follows: unreviewed and reviewed; (ii) sub-list(s) having an unreviewed status are displayed as a list of items scrollable in the primary direction; and (iii) sub-list(s) having a reviewed status are displayed in a marquee fashion.

In some embodiments of the present disclosure: (i) there are two reader-attention statuses in the plurality of reader-attention statuses as follows: read and unread; (ii) sub-list(s) having an unread status are displayed as a list of items scrollable in the primary direction; and (iii) sub-list(s) having a read status are displayed in a marquee fashion.

In some embodiments of the present disclosure: (i) there are three reader-attention statuses in the plurality of reader-attention statuses as follows: unreviewed, reviewed-but-not-read and read; (ii) sub-list(s) having an unreviewed status are displayed as a list of items scrollable in the primary direction; and (iii) sub-list(s) having a read status are displayed in a marquee fashion.

In some embodiments of the present disclosure: (i) the primary scrolling direction is a vertical direction defined by a structure of a viewing device upon which the plurality of sub-lists is displayed; and (ii) the secondary scrolling direction is a horizontal direction defined by the structure of the viewing device.

Optionally, the method 2000 can comprise a step 2400. At step 2400, at least two of the overlapping reviewed sub-lists can be merged into one reviewed sub-list so as to provide a further read-friendly feature. This can be performed as follows, for example. Provided that the start position and end position of the current reviewed sub-list are A and B respectively, and the start position and end position of a pre-existing reviewed sub-list are C and D respectively. Overlapping occurs when B is earlier than C and merging can be done. More specifically, if B is earlier than C but later than D, the merged read list will be from A to D. Otherwise, if B is earlier than D, the merged read list will be from A to B. In other words, if multiple reviewed sub-lists and multiple unreviewed sub-lists are intermingled when displayed in chronological order, then there may be multiple "marquee controls" to collapse each reviewed sub-list at its chronological position relative to the unreviewed sub-lists. Also, in this example it is reviewed and unreviewed sub-lists that are potentially chronologically intermingled. Two other embodiments are as follows: (i) two types of sub-lists, read sub-list(s) and unread (both reviewed and unreviewed items together) sub-lists, are chronologically intermingled, with one (or both) types of sub-list(s) being collapsed into "marquee displays"; and (iii) three types of sub-lists (unreviewed sub-list(s), reviewed-not-read sub-list(s) and read sub-list(s)) where one (or two, or all three) types of chronologically intermingled sub-list type(s) are collapsed into marquee display(s).

Method 2000 can be ended after step 2400.

With reference now to FIG. 3, FIG. 3 shows an example to illustrate the method according to an embodiment of the present invention.

An item list from the server is shown in the first column in FIG. 3. In the item list, items are arranged in time sequence with the latest item at 18:01 and earliest item at 12:09.

When the item list is displayed on a screen, the user may use a scrollbar or the like, for example, to scroll down the item list. The second column in FIG. 3 shows a first sight view by the user. In this first sight view, the latest item, in other words, item 18:01, is determined as the start position. The third column in FIG. 3 shows a second sight view by the user. The bottom item in the screen, in other words, item 13:21, is determined as the end position, assuming that the user exits the application now.

In the read progress 1 as shown in the fourth column in FIG. 3, the items between the start position "item 18:01" and end position "item 13:21" are identified as in a reviewed sub-list. The items earlier than the end position "item 13:21" are identified as in an unreviewed sub-list.

When the user refreshes to update or changes his/her terminal, new items come up, as shown in the read progress 2 in the fifth column in FIG. 3. Here, the new coming items from "item 20:12" to "item 18:05" are all later than the "item 18:01" and thus are identified as in the new unreviewed sub-list. The unreviewed sub-list determined previously becomes the old unreviewed sub-list now.

According to a preferred embodiment, the reviewed sub-list can be displayed by an improved view on the client. For example, the reviewed sub-list with a start position "item 18:01" and an end position "item 13:21" can be displayed by a first marquee control, and another reviewed sub-list with a start position "item 11:05" and an end position "item 10:59" can be displayed by a second marquee control, as shown in the sixth column in FIG. 3. The solid-line box shows the first sight view on the client, containing the first marquee control. If the user pulls down the scrollbar, for example, more items will be displayed on the client, as shown in the box in the broken line, and the second marquee control will be encountered. The marquee control has a previous button and a next button, with item title displayed in the window. By clicking the previous or next button at the two sides of the marquee control, the user can turn to any item in the reviewed sub-list. This can save the limited display space of a screen and provides a quick way to access to the read and unreviewed sub-lists.

Optionally, a new reviewed sub-list and the existed reviewed sub-lists can be merged into one, as shown in the seventh column in FIG. 3. In this example, after refreshing the list, the new reviewed sub-list will contain items from the start position "item 20:12" to the end position "item 10:58". Since the end position "item 10:58" of the current reviewed sub-list is earlier than the end positions "item 13:21" and "item 10:59" of two previously determined reviewed sub-lists, the reviewed sub-list after merging will absorb the two previously determined reviewed sub-lists and will be from "item 20:12" to "item 10:58". Therefore, there are less reviewed sub-lists after merging, and thus display space will be further saved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a plurality of chronologically-ordered items, with each item of the plurality of chronologically-ordered items: (i) including a link to linked content, (ii) having a received date and time (date/time) associated with the item, and (iii) having a status of read or unread based upon whether the item has been previously displayed;
   dividing the list of items into at least one read sub-list and a plurality of unread sub-lists where: (i) each read sub-list is a list of chronologically consecutive item(s) having read status, and (ii) each unread sub-list is a list of chronologically consecutive item(s) having an unread status; and
   displaying the plurality of unread sub-lists and the at least one read sub-list so that: (i) each item of each unread sub-list is displayed in chronological order and in a vertically scrolling manner, (ii) the read sub-list is displayed in chronological order between a previous unread sub-list and subsequent unread sub-list, (iii) the read sub-list vertically scrolls in a display location between the previous unread sub-list and the subsequent unread sub-list, and (iv) the items in the read sub-list are collapsed into the form of a marquee control such that only the items of the read sub-list scroll horizontally in chronological order.

2. The computer-implemented method of claim 1 wherein the displaying is performed on a touchscreen display of a mobile phone.

3. The computer-implemented method of claim 1 wherein:
   items of the previous unread sub-list have associated dates and times prior to a first session-in event; and
   items of the subsequent unread sub-list have associated dates and times subsequent to the first session-in event.

4. The computer-implemented method of claim 1 wherein the list is a combined list of status items, news items and email items.

5. A computer program product comprising:
   a computer readable storage medium; and
   computer code stored on the machine readable storage device, with the computer code including instructions for causing a processor(s) set to perform operations including the following:
   receiving a plurality of chronologically-ordered items, with each item of the plurality of chronologically-ordered items: (i) including a link to linked content, (ii) having a received date and time (date/time) associated with the item, and (iii) having a status of read or unread based upon whether the item has been previously displayed,
   dividing the list of items into at least one read sub-list and a plurality of unread sub-lists where: (i) each read sub-list is a list of chronologically consecutive item(s) having a read status, and (ii) each unread sub-list is a list of chronologically consecutive item(s) having an unread status, and
   displaying the plurality of unread sub-lists and the at least one read sub-list so that: (i) each item of each unread sub-list is displayed in chronological order and in a vertically scrolling manner, (ii) the read sub-list is displayed in chronological order between a previous unread sub-list and subsequent unread sub-list, (iii) the read sub-list vertically scrolls in a display location between the previous unread sub-list and the subsequent unread sub-list, and (iv) the items in the read sub-list are collapsed into the form of a marquee control such that only the items of the read sub-list scroll horizontally in chronological order.

6. The computer program product of claim 5 wherein the displaying is performed on a touchscreen display of a mobile phone.

7. The computer program product of claim 5 wherein:
items of the previous unread sub-list have associated dates and times prior to a first session-in event; and
items of the subsequent unread sub-list have associated dates and times subsequent to the first session-in event.

8. The computer program product of claim 5 wherein the list is a combined list of status items, news items and email items.

9. A computer system comprising:
a processor(s) set;
a computer readable storage medium; and
computer code stored on the computer readable storage medium, with the computer code including instructions for causing the processor(s) set to perform operations including the following:
receiving a plurality of chronologically-ordered items, with each item of the plurality of chronologically-ordered items: (i) including a link to linked content, (ii) having a received date and time (date/time) associated with the item, and (iii) having a status of read or unread based upon whether the item has been previously displayed,
dividing the list of items into at least one read sub-list and a plurality of unread sub-lists where: (i) each read sub-list is a list of chronologically consecutive item(s) having a read status, and (ii) each unread sub-list is a list of chronologically consecutive item(s) having an unread status, and
displaying the plurality of unread sub-lists and the at least one read sub-list so that: (i) each item of each unread sub-list is displayed in chronological order and in a vertically scrolling manner, (ii) the read sub-list is displayed in chronological order between a previous unread sub-list and subsequent unread sub-list, (iii) the read sub-list vertically scrolls in a display location between the previous unread sub-list and the subsequent unread sub-list, and (iv) the items in the read sub-list are collapsed into the form of a marquee control such that only the items of the read sub-list scroll horizontally in chronological order.

10. The computer system of claim 9 wherein the displaying is performed on a touchscreen display of a mobile phone.

11. The computer system of claim 9 wherein:
items of the previous unread sub-list have associated dates and times prior to a first session-in event; and
items of the subsequent unread sub-list have associated dates and times subsequent to the first session-in event.

12. The computer system of claim 9 wherein the list is a combined list of status items, news items and email items.

* * * * *